United States Patent
Asarikuniyil et al.

(10) Patent No.: US 9,516,357 B2
(45) Date of Patent: Dec. 6, 2016

(54) RECORDING VARIABLE-QUALITY CONTENT STREAM

(75) Inventors: Binny Asarikuniyil, Irving, TX (US); Venkata S. Adimatyam, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1813 days.

(21) Appl. No.: 12/879,194

(22) Filed: Sep. 10, 2010

(65) Prior Publication Data

US 2012/0066338 A1    Mar. 15, 2012

(51) Int. Cl.
   *G06F 15/173* (2006.01)
   *G06F 15/16* (2006.01)
   *H04N 21/238* (2011.01)
   *H04N 21/262* (2011.01)
   *H04N 21/442* (2011.01)
   *H04N 21/6377* (2011.01)

(52) U.S. Cl.
   CPC .. *H04N 21/23805* (2013.01); *H04N 21/26216* (2013.01); *H04N 21/44209* (2013.01); *H04N 21/6377* (2013.01)

(58) Field of Classification Search
   CPC .................. H04N 21/23805; H04N 21/26216
   USPC ........................ 709/224, 232, 231
   See application file for complete search history.

(56) References Cited

U.S. PATENT DOCUMENTS

| | | | |
|---|---|---|---|
| 5,660,383 A * | 8/1997 | Ueffinger et al. ............ | 271/3.18 |
| 6,570,848 B1 * | 5/2003 | Loughran et al. ......... | 370/230.1 |
| 6,633,585 B1 * | 10/2003 | Ghanwani et al. ........... | 370/468 |
| 6,662,231 B1 * | 12/2003 | Drosset et al. ............... | 709/229 |
| 6,754,179 B1 * | 6/2004 | Lin ............................... | 370/235 |
| 6,810,417 B2 * | 10/2004 | Lee ............................... | 709/220 |
| 6,920,110 B2 * | 7/2005 | Roberts et al. ............... | 370/235 |
| 7,016,085 B2 * | 3/2006 | Gonzalez et al. ............ | 358/405 |
| 7,027,401 B1 * | 4/2006 | Ozegovic ...................... | 370/236 |
| 7,411,901 B1 * | 8/2008 | Alexander et al. ........... | 370/230 |
| 7,436,773 B2 * | 10/2008 | Cunningham ................ | 370/236 |
| 7,500,010 B2 * | 3/2009 | Harrang et al. .............. | 709/233 |
| 7,562,410 B2 * | 7/2009 | Morris et al. ................. | 709/220 |
| 7,990,857 B2 * | 8/2011 | Jain et al. ..................... | 370/229 |
| 8,116,202 B2 * | 2/2012 | Liaw et al. .................... | 370/232 |
| 8,270,296 B2 * | 9/2012 | Rojahn ......................... | 370/235 |
| 8,510,458 B2 * | 8/2013 | Nassor et al. ................ | 709/231 |
| 8,559,460 B2 * | 10/2013 | Rojahn ......................... | 370/468 |
| 2001/0012271 A1 * | 8/2001 | Berger .......................... | 370/230 |
| 2002/0081971 A1 * | 6/2002 | Travostino ..................... | 455/41 |
| 2003/0145100 A1 * | 7/2003 | Marchetto et al. ........... | 709/233 |
| 2005/0091398 A1 * | 4/2005 | Roberts et al. ............... | 709/232 |
| 2005/0157723 A1 * | 7/2005 | Kim et al. .................... | 370/392 |
| 2006/0159098 A1 * | 7/2006 | Munson et al. .............. | 370/394 |
| 2008/0037420 A1 * | 2/2008 | Tang ............................. | 370/229 |
| 2008/0086751 A1 * | 4/2008 | Horn et al. .................... | 725/87 |
| 2009/0300203 A1 * | 12/2009 | Virdi et al. ................... | 709/231 |
| 2012/0203872 A1 * | 8/2012 | Luby et al. ................... | 709/219 |
| 2012/0218891 A1 * | 8/2012 | Sundararajan et al. ...... | 370/231 |

* cited by examiner

Primary Examiner — Karen Tang

(57) ABSTRACT

A device may include a network interface and a processor. The network interface may receive data over a network and send data over the network. The processor may receive, from a remote device, a first portion of content at a first quality via the network interface. In addition, the processor may record the first portion of the content at the first quality, obtain bandwidth information, send the bandwidth information to a remote device via the network interface, and receive, from the remote device via the network interface, a second portion of the content at a second quality. Furthermore, the processor may record the second portion of the content at the second quality and schedule a download of the content at a fixed quality from a remote system.

20 Claims, 7 Drawing Sheets

RECORDING VARIABLE-QUALITY CONTENT STREAM

BACKGROUND

Many of today's entertainment or communication-related electronic devices rely on receiving, transmitting, and/or using streamed digital data or content. For example, a set-top box may receive broadcast television programs and/or video-on-demand (VOD) that is streamed from a content provider. A personal computer may receive a stream of a video clip over the Internet. A soft phone may receive streaming audio data over a real-time transport protocol (RTP) link/channel that is established over an Internet Protocol (IP) network.

DETAILED DESCRIPTION

The following detailed description refers to the accompanying drawings. The same reference numbers in different drawings may identify the same or similar elements. As used herein, the terms "playing content" may refer to decoding encoded content, and outputting the decoded content to a presentation device (e.g., television). The encoded content may be obtained from a local media (e.g., hard disk drive) or received from a remote device over a network. In some instances, "playing content" may also refer to routing or directing content to the content presentation device without decoding and/or encoding.

As used herein, the term "quality" may include resolution (e.g., pixels per inch), bit-rate and/or other characteristics that are associated with video and/or audio. The term "cloud computing" or "cloud," as used herein, may refer to network-based computing or shared resources (e.g., software, memory, data, etc.) that are accessible over the network (e.g., the Internet).

As described herein, in a system, a device may receive a variable-quality content stream from a remote device. For example, depending on the currently available network bandwidth and/or other resources available at the device, the remote device may stream a video to the device at different viewing qualities. To allow, at a later time, a viewer at the device to access the video at a consistent or fixed quality, the system may schedule the video to be re-downloaded to the device at a single quality (e.g., at the highest available quality).

Figure 1:
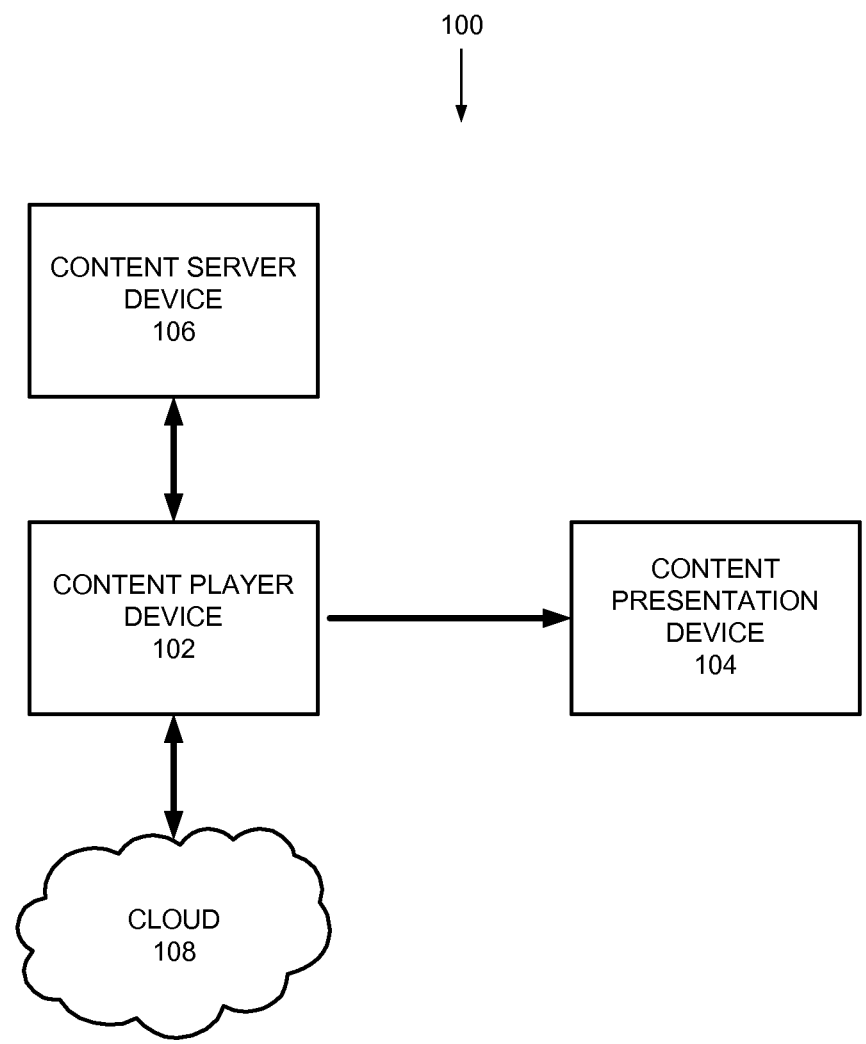
FIG. 1 illustrates concepts described herein.

FIG. 1 illustrates the concepts described herein. As shown, a system 100 may include a content player device 102 (e.g., a set-top box, audio player, game console, etc.), a content presentation device 104 (e.g., a television, speakers, displays, etc.), a content server device 106 (e.g., a device at a content provider), and a cloud 108. These devices and components will be described in greater detail below, with reference to FIG. 2A through FIG. 4.

In FIG. 1, content player device 102 may receive a streaming content from content server device 106. Depending on the currently available bandwidth at content player device 102, content server device 106 may stream the content at different qualities (e.g., high resolution, intermediate resolution, and low resolution). Accordingly, content player device 102 may output the content at different qualities at content presentation device 104.

Assume that content player device 102 provides for a digital-video-recorder (DVR)-like functionality. That is, a user at content player device 102 may fast forward, rewind, replay, etc., the content. To support such functionality, content player device 102 may record the variable-quality content stream from content server device 106. Consequently, in immediately reviewing the recorded content stream, a user may notice sudden changes in the quality of content.

To allow, at another time, the user to play the content at a fixed quality (e.g., the best quality available for the user in accordance with the user's subscribed service), system 100 may automatically schedule the content to be re-downloaded to content player device 102, at the fixed quality, from another device/component in system 100. For example, at the scheduled time, cloud 108 may stream the content to content player device 102. Content player device 102 may overwrite the recorded variable-quality content with the fixed-quality content, subsequently allowing the user to enjoy the consistent-quality content.

Figure 2A:
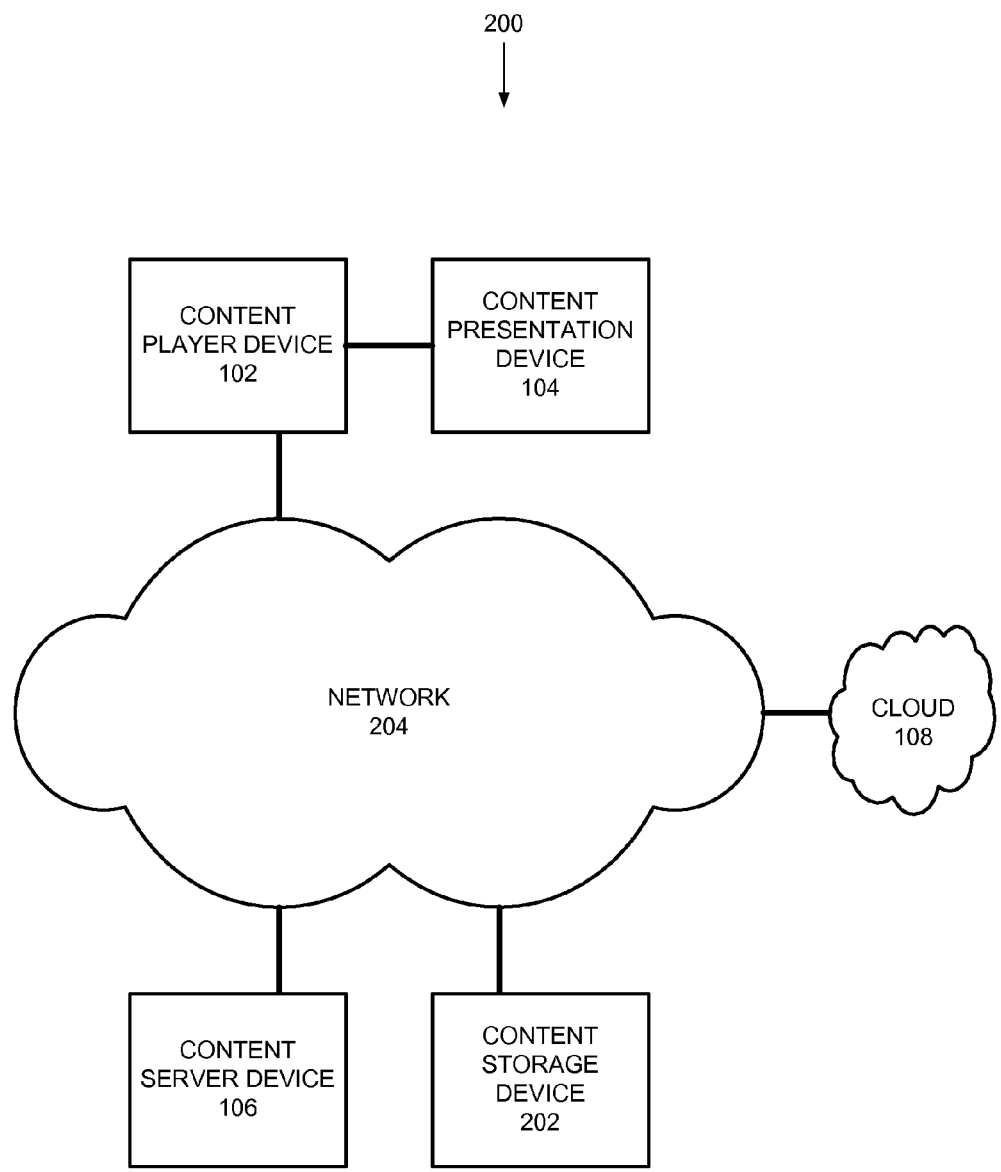
FIG. 2A illustrates an exemplary system in which concepts described herein may be implemented.

FIG. 2A shows an exemplary system 200 in which concepts described herein may be implemented. As shown, system 200 may include a content player device 102, content presentation device 104, content server device 106, content storage device 202, cloud 108, and network 204.

Content player device 102 may receive encoded content over network 204, decode the content, and/or output the decoded content to content presentation device 104. In some implementations, content player device 102 may obtain the content from content server device 106, which may be part of a content distribution system (e.g., a video/audio broadcast system, content-on-demand distribution system, and/or local storage component (e.g., a hard disk drive)).

In addition to outputting decoded content to content presentation device 104, content player device 102 may perform actions in response to commands (e.g., record, fast forward, pause, select a program/content, etc.) that are issued from a remote control (not shown). These commands may cause content player device 102 to record or access the content at/from a local storage component/device.

Examples of content player device 102 may include a set-top box or a component (e.g., a cable card) that plugs-into a host device (e.g., a digital video recorder, a personal computer, a television, a stereo system, a tablet computer, a laptop computer, etc.) and allows the host device to display multimedia content (e.g., contents on digital cable television channels). Although content player device 102 can be implemented as different types of devices (e.g., a set-top-box, computer (e.g., personal computer, tablet computer, laptop computer, etc.), cable card, etc.), in the following, content player device 102 is described in terms of a set-top box.

Content presentation device 104 may include, for example, a television, display, speakers, etc. Content presentation device 104 may receive digital and/or analog content from content player device 102 and present the content via its display screen and/or its speakers.

Content server device 106 (e.g., video head end) may obtain content (e.g., a video program, audio program, advertisement, web page, etc.) from content storage device 202 and/or send the content to content player device 102 and/or content presentation device 104 over network 204. Content storage device 202 may retrieve content (e.g., a movie, a music file, an advertisement, text, a web page, etc.) and send the content to content server device 202 when content storage device 202 receives a request for content from content server device 106.

Network 204 may include one or more wired and/or wireless networks that are capable of exchanging information, such as voice, video, documents, multimedia, text, etc. For example, network 204 may include one or more public switched telephone networks (PSTNs) or another type of switched network. Network 204 may also include a number of transmission towers for receiving wireless signals and forwarding the signals toward the intended destination. Network 204 may further include one or more packet switched networks, such as an Internet protocol (IP) based network, a local area network (LAN), a wide area network (WAN), a personal area network (PAN), an intranet, the Internet, or another type of network that is capable of exchanging information.

In FIG. 2A, when content player device 102 records streaming content from content server device 106, one of devices 102, 106, and/or 108 may schedule the content to be re-downloaded at a fixed quality. For example, assume that content player device 102 downloads a movie at low and medium qualities. In such an instance, content player device 102 and/or content server device 106 may schedule a re-download of the movie at a high quality, from content server device 106 and/or cloud 108.

Depending on the implementation, system 200 may include additional, fewer, different, or a different arrangement of devices than those illustrated in FIG. 2A. For example, in one implementation, system 200 may include additional content player devices, content presentation devices, etc. In another example, content server device 106, content storage device 202 and cloud 108 may be part of the same device/subsystem. In yet another example, system 200 may include a personal computer or a laptop computer that is communicating with content player device 102 via local network connections. Furthermore, although not shown in FIG. 2A, system 200 may include other types of network elements, such as routers, bridges, switches, gateways, servers, etc., that route data in system 200.

Figure 2B:
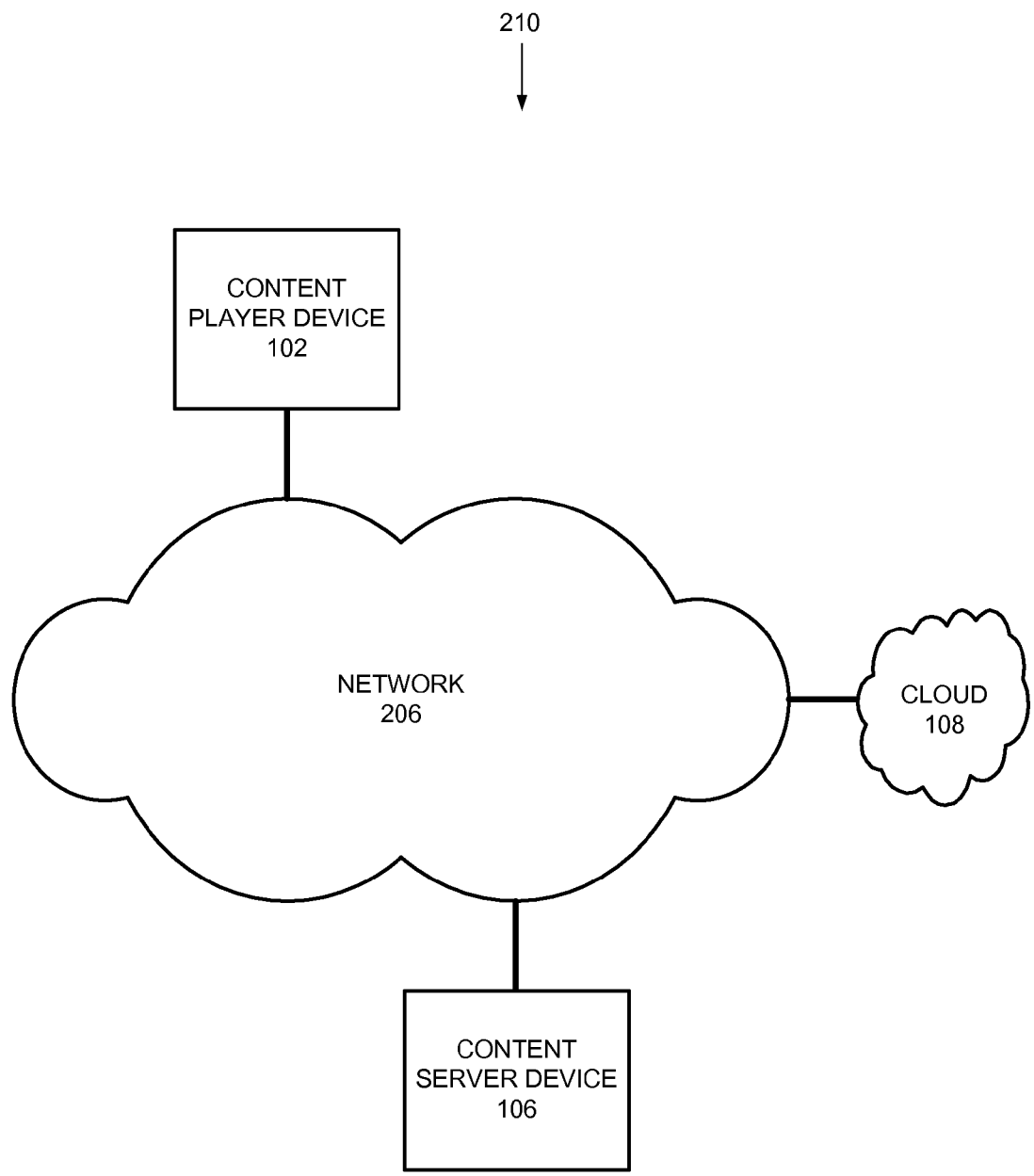
FIG. 2B illustrates another exemplary system in which the concepts described herein may be implemented.

FIG. 2B illustrates another exemplary system 210 in which the concepts described herein may be implemented. In contrast to system 200 in FIG. 2A, system 210 does not include a content presentation device 104 and content storage device 202. In this implementation, the functionalities of content presentation device 103 may be included in content player device 102 (e.g., content is displayed on a display screen of content player device 102) and the functionalities of content storage device 202 may be included in cloud 108 (e.g., cloud 108 may store the contents of content storage device 202).

Figure 3:
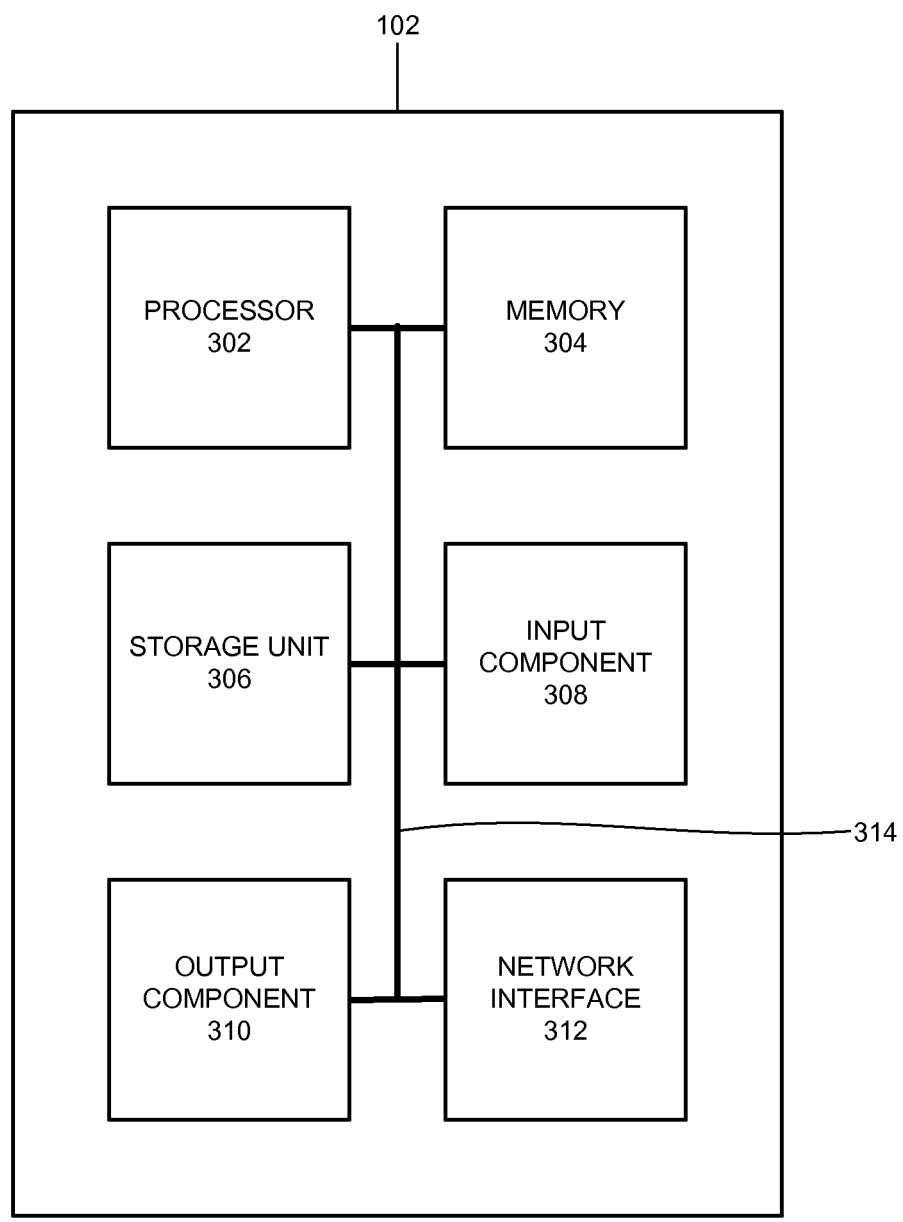
FIG. 3 is a block diagram of exemplary components of an exemplary content player device of FIGS. 2A and 2B.

FIG. 3 is a block diagram of an exemplary network device 300, which may correspond to one or more of devices 102, 104, 106, 202 and/or devices in cloud 108. As shown, network device 300 may include a processor 302, memory 304, storage unit 306, input component 308, output component 310, network interface 312, and communication path 314. In different implementations, network device 300 may include additional, fewer, different, or different arrangement of components than the ones illustrated in FIG. 3. For example, network device 300 may include line cards for connecting to external buses.

Processor 302 may include a processor, a microprocessor, an Application Specific Integrated Circuit (ASIC), a Field Programmable Gate Array (FPGA), and/or other processing logic (e.g., embedded devices) capable of controlling network device 300. Memory 304 may include static memory, such as read only memory (ROM), and/or dynamic memory, such as random access memory (RAM), or onboard cache, for storing data and machine-readable instructions (e.g., programs, scripts, etc.). Storage unit 306 may include a floppy disk, CD ROM, CD read/write (R/W) disc, and/or flash memory, as well as other types of storage devices (e.g., hard disk drive) for storing data and/or machine-readable instructions (e.g., a program, script, etc.).

Input component 308 and output component 310 may provide input and output from/to a user to/from network device 300. Input/output components 308 and 310 may include a display screen, a keyboard, a mouse, a speaker, a microphone, a camera, a DVD reader, Universal Serial Bus (USB) lines, and/or other types of components for converting physical events or phenomena to and/or from signals that pertain to network device 300.

Network interface 312 may include a transceiver (e.g., a transmitter or receiver) for network device 300 to communicate with other devices and/or systems. For example, via network interface 312, network device 300 may communicate over a network, such as the Internet, an intranet, a terrestrial wireless network (e.g., a WLAN, WiFi, WiMax, etc.), a satellite-based network, optical network, etc. Network interface 312 may include a modem, an Ethernet interface to a LAN, and/or an interface/connection for connecting network device 300 to other devices (e.g., a Bluetooth interface).

Communication path 314 may provide an interface through which components of network device 300 can communicate with one another.

Figure 4:
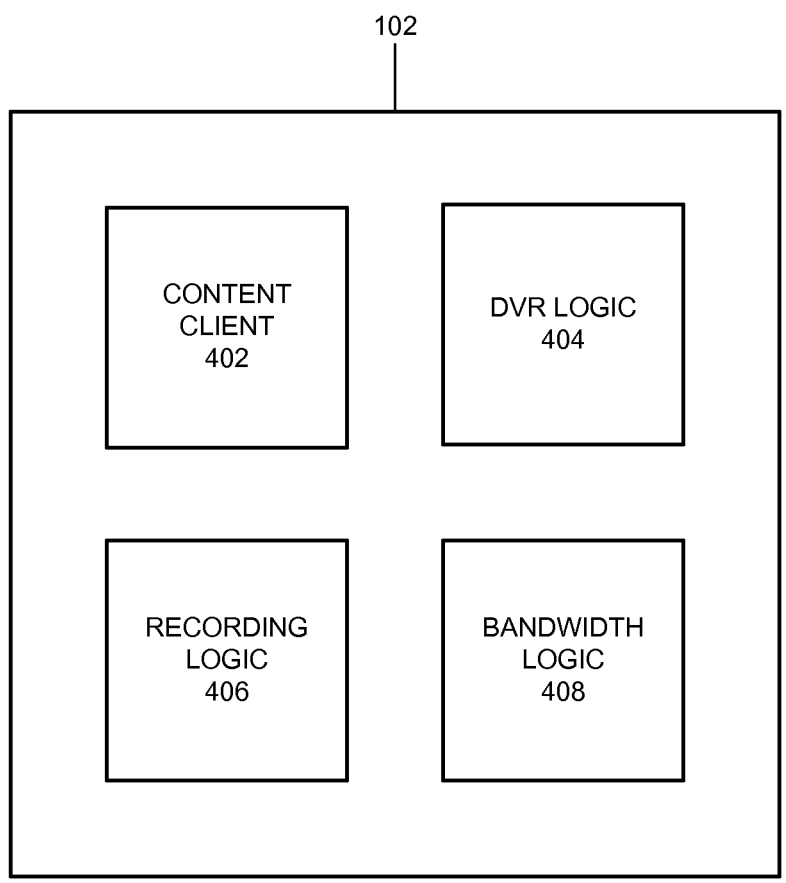
FIG. 4 is a block diagram of exemplary functional components of the content player device of FIGS. 2A and 2B.

FIG. 4 is a block diagram of exemplary functional components of content player device 102. As shown, content player device 102 may include a content client 402, digital video recorder (DVR) logic 404, recording logic 406, and bandwidth logic 408. All or some of these logic components may be implemented by processor 302 executing software instructions stored in a memory 304 (e.g., a memory coupled to processor 302) or storage unit 306.

Depending on the implementation, content player device 102 may include additional, fewer, different, or a different arrangement of components than those illustrated in FIG. 4. For example, in one implementation, a component may include functionalities of one or more other components (e.g., content client 402 may include functionalities of a codec component (not shown), DVR logic 404 includes the functionalities of recording logic 406, etc.). In addition, for simplicity, FIG. 4 does not show a number of components, such as graphical user interface (GUI) components, an operating system (e.g., Linux), network communication software, applications/scripts (e.g., http server, XML parser, common gateway interface (CGI), WiFi client, etc.), an email client, an instant messaging client, a web browser, a music player, etc.

Content client 402 may receive commands from a user, for example, via a remote control, and perform actions that are associated with the commands. The commands may be related to selecting content, purchasing content, playing content, recording content, downloading content, providing information about content (e.g., information about scheduled television programs, movies that are available for purchase, a live sports cast, etc.). Content client 402 may provide a menu system that a user may navigate to obtain additional information, to select different programs, etc.

DVR logic 404 may provide functions that are associated with a digital video recorder, such as playing content (e.g., playing a movie (e.g., a three-dimensional (3D) movie, 2D movie, etc.), music, etc.), fast forwarding content, rewinding content, recording content, deleting content, etc. In some implementations, DVR logic 404 may allow a user to schedule recording broadcast content. When recording content, DVR logic 404 may use or invoke recording logic 406.

Recording logic 406 may record content, which may be received from content server device 106 and/or cloud 108, at storage unit 306. Recording logic 406 may record variable-quality content or fixed-quality content. When recording variable-quality content, recording logic 406 may receive content whose quality (e.g., display resolution (e.g., pixels per inch), sound quality, etc.) may vary during the recording. In these instances, recording logic 406 may record not only the content itself, but also the times at which the qualities of the content being recorded change. At the end of a variable-quality recording, recording logic 406 may schedule a re-recording of the content, at a fixed/constant quality. Depending on the implementation, content player device 102, content server device 106, and/or cloud 108 may perform the scheduling.

When recording fixed-quality content, recording logic 406 may receive a content stream whose quality is constant over time from content server device 106 and/or cloud 108. In these types of recordings, recording logic 406 may receive the content at a rate (e.g., a very low bit rate) different from the rate at which content player 102 received the variable-quality content. After recording the fixed-quality content, content player device 102 may delete the corresponding variable-quality content, or alternatively, combine the downloaded fixed-quality content with the corresponding variable-quality content, as described below with reference to FIG. 5.

Bandwidth logic 408 may determine, at content player device 102, bandwidth available to receive additional data/information over network 204 and provide the bandwidth information to a remote device, such as content server device 106. For example, when a user selects a movie via content client 402, content client 402 may send a request to content server device 106 for the movie to be downloaded at content player device 102. While the movie is being downloaded, bandwidth logic 408 may periodically determine an available network bandwidth at content player device 102 (e.g., the maximum bandwidth at which content player device 102 can receive content minus the bandwidth currently being used by content player device 102).

In some implementations, bandwidth logic 408 may determine the available bandwidth at content player device 102 based on bandwidth information from other network devices, such as a computer connected locally to a common communication line, a set-top box that is receiving another content item, as well as device parameters pertaining to content player device 102 (e.g., the maximum rate at which content player device 102 can receive data over a particular network interface, etc.).

Figure 5:
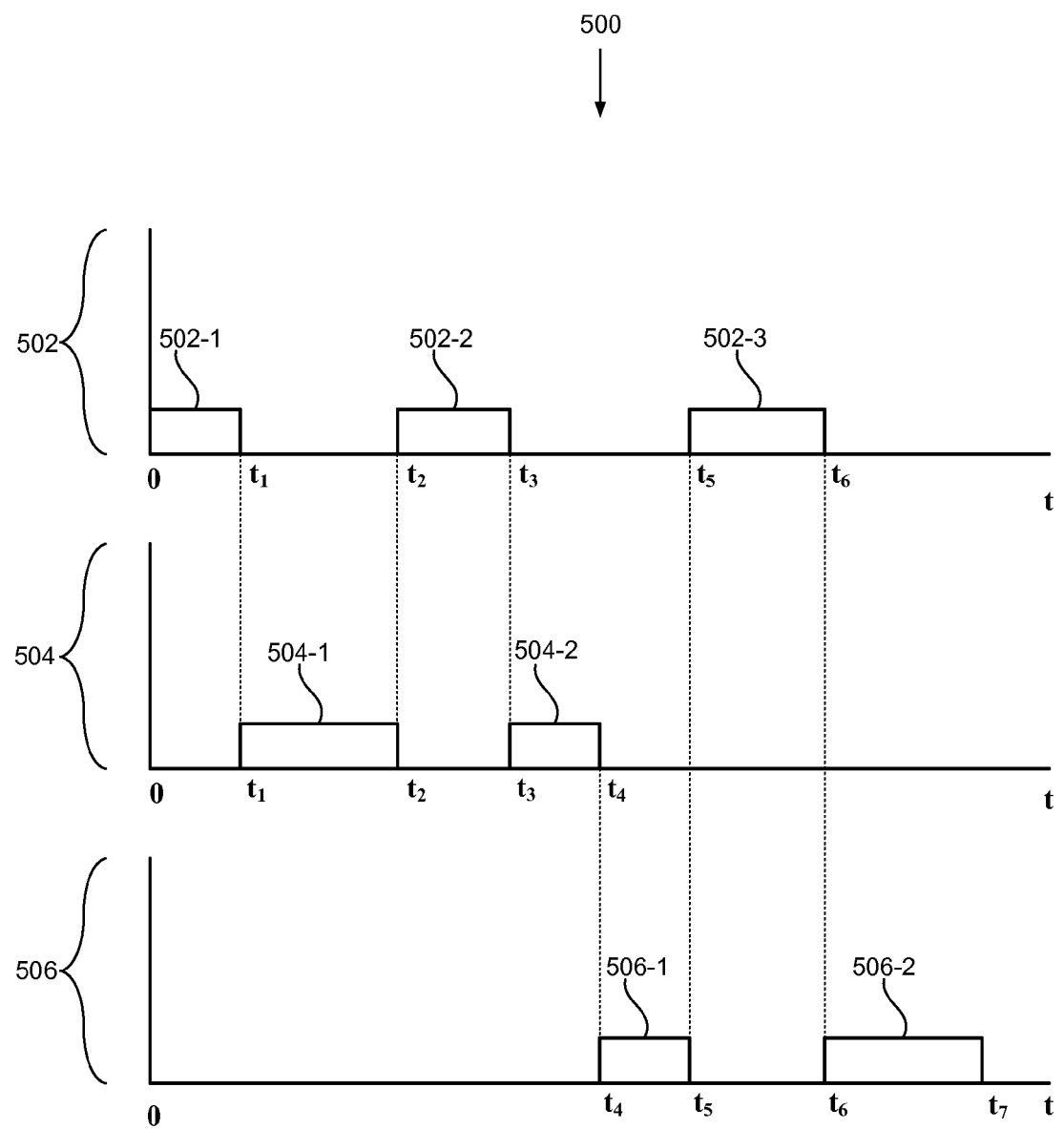
FIG. 5 is an exemplary timing diagram illustrating an exemplary variable-quality content stream recording.

FIG. 5 is a timing diagram that illustrates an exemplary variable-quality content stream recording 500. As shown, recording 500 may include low-quality recordings 502 (i.e., low-quality recording 502-1 and recording 502-2), intermediate-quality recording 504 (i.e., intermediate-quality recording 504-1 and recording 504-2), and a high-quality recording 506 (i.e., high quality recording 506-1 and recording 506-2). Depending on the implementation, recording 500 may include fewer or additional recordings at low, intermediate, high, or another quality.

Assume that BN and CN represent, respectively, a bandwidth threshold associated with a stream at a given quality and a threshold for the amount of buffered content (measured in seconds) that may be played by content player device 102 at the given quality. For example, assume that B1 and C1 associated with a low quality stream are 15 megabit per second (MB) and 10 seconds, respectively; B2 and C2 associated with an intermediate-quality stream are 25 MB and 10 seconds; and B3 and C3 associated with a high quality stream are 40 MB and 10 seconds.

Assume that content server device 106 begins to stream content to content player device 102 at the intermediate quality based on available bandwidth at content player device 102. Also, assume that although the available bandwidth at content player device 102 is above B2, content player device 102 has buffered less than C2 (i.e., 10 seconds) of intermediate-quality content. Accordingly, content player device 102 makes low-quality recording 502-1 and sends a corresponding low-quality stream to content presentation device 104.

When content player device 102 has buffered more than N seconds of the content at the intermediate quality, at $t_1$, content player device 102 makes intermediate-quality recording 504-1 and sends a corresponding stream to content presentation device 104.

During recording 504-1, the available bandwidth at content player device 102 intermittently falls below B2, causing the amount of buffered intermediate-quality content to dwindle to an amount less than C2 (e.g., 2 seconds of content). Accordingly, at $t_2$, content player device 102 records low-quality stream 502-2 and sends a corresponding stream to content presentation device 104.

During recording 502-2, when the available bandwidth at content player device 102 rises above B2 for a sustained period of time and the buffered content rises to above the amount corresponding to C2 (e.g., 10 seconds), at $t_3$, content player device 102 makes recording 504-2 and transmits a corresponding intermediate-quality stream to content presentation device 104.

Content player device 102 sends a high-quality content stream to content presentation device 104 when the bandwidth at content player device 102 rises to above B3 for long enough time to cause the buffered high-quality content from content server device 106 to rise above C3. Content player device 102 makes high-quality recording 506-1 that corresponds to the high quality content stream sent from content player device 102 to content presentation device 104.

Content player device 102 operates in a manner similar to that described above in making recordings 502-3 and 506-2, respectively, in response to changing available bandwidth and the amount of buffered content.

During recording 500, content player device 102 also records the start time and the end time for each of recordings 502-1, 502-2, 502-3, 504-1, 504-2, 506-1, and 506-2.

Once recording 506-2 is complete (e.g., the last portion of the content), content player device 102 may schedule the content to be re-downloaded, at a fixed quality, from content server device 106 or cloud 108. This may be done in one of several ways. For example, in one configuration/implementation, at the scheduled time, content player device 102 may send a request for the content to content server device 106/cloud 108. Alternatively, content server device 106 or cloud 108 may initiate the re-download at the scheduled time.

In re-downloading the content, content server device 106/cloud 108 may send either the entire content (from the beginning to the end) or only the portions that have not been recorded at a given quality. For example, in FIG. 5, content server device 106/cloud 108 may send portions that correspond to recordings 502-1, 502-2, 502-3, 504-1, and 504-2 to content player device 102. When content player device 102 receives these portions, content player device 102 may splice them with the portions corresponding to recordings 506-1 and 506-2. Because the re-download from content server device 106/cloud 108 does not entail simultaneous playing/viewing, the re-download can be performed at a low data rate, depending on the priorities of other processes and/or network resource allocations at content player device 102 and other local network devices.

In the above implementation, recordings 502, 504, and 506 depend partly on the amount of buffered content at the low, intermediate, and high qualities. More specifically, content player device 102 is required to buffer content at a given quality above a certain amount before content player device 102 can record/play the content at that quality. This may prevent content player device 102 from rapidly switching back and forth between different qualities and having a "quality jitter."

In other implementations, content player device 102 may record the content or send the content to content presentation device 104 without accounting for the amount of buffered content, at a particular quality. For example, in some networks, the available bandwidth at content player device 102 may be stable (e.g., varies slowly). In such networks, content player device 102/content server device 106 may switch the quality of a content stream based on the available bandwidth at content player device 102.

Figure 6:
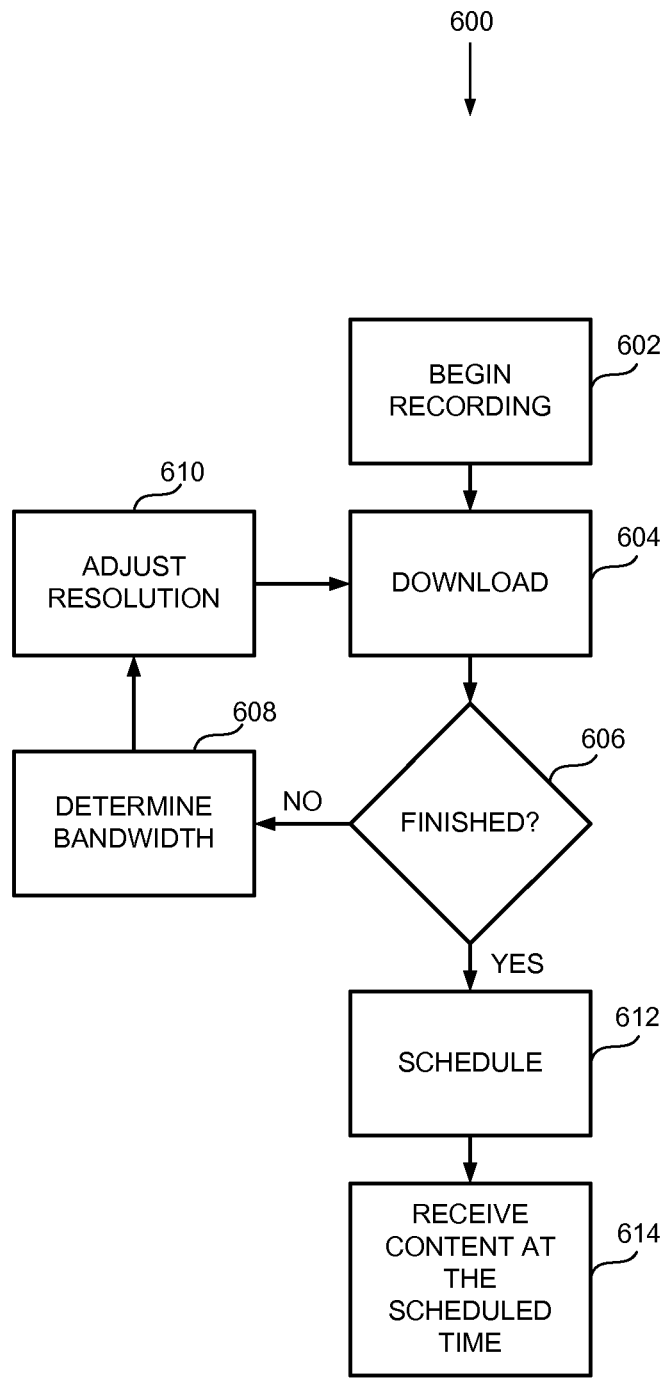
FIG. 6 is a flow diagram of an exemplary process that is associated with recording a variable-quality content stream.

FIG. 6 is a flow diagram of an exemplary process 600 that is associated with recording a variable-quality content stream. As shown, process 600 may start with a user triggering a DVR function and causing content player device 102 to begin recording content (block 602) that is being downloaded (block 604).

Content player device 102 may determine whether the content has finished downloading (block 606). If the content has not finished downloading (block 606—NO), content player device 102 may determine a locally available bandwidth (block 608). In addition, content player device 102 may send the bandwidth information to content server device 106. Content server device 106 may use the bandwidth information to adjust (e.g., increase, decrease, or maintain) the quality of the content being streamed to content player device 102 (block 610).

In addition, based on the available bandwidth, content player device 102 may change the quality of the content being transmitted to content presentation device 104 and/or being recorded at content player device 102 (block 610). In some implementations, as described above with reference to FIG. 5, content player device 102 may take into account the amount of content buffered at content player device 102 at a particular quality, to reduce "quality jitter." Process 600 may proceed to block 604, where content player device 102 may continue to download the content.

If content player device 102 has finished downloading (block 606—YES), content player device 102, content server device 106, and/or cloud 108 may schedule a re-download of the content at another time (block 612), provided that the entirety of the content has not already been downloaded at the desired quality.

At block 614, content player device 102 may receive the content from content server device 106/cloud 108 at the scheduled time. As described above, in some implementations, content player device 102 may receive the entirety of the content at a desired quality. In other implementations, content player device 102 may receive only the portions that have not already been recorded at the desired quality. Once the content is re-downloaded, content player device 102 may either replace the entire variable-quality content with the fixed-quality content, or replace the portions that have been recorded at undesirable qualities.

In the above, in system 200, content player device 102 may receive a variable-quality content stream from content server device 106. For example, depending on the currently available network bandwidth at content player device 102, content server device 106 may stream a video to content player device 102 at different qualities. To allow, at a later time, the user at content player device 102 to access the content at a consistent quality, the system may schedule the content to be re-downloaded to content player device 102 at a fixed or constant quality.

The foregoing description of implementations provides illustration, but is not intended to be exhaustive or to limit the implementations to the precise form disclosed. Modifications and variations are possible in light of the above teachings or may be acquired from practice of the teachings.

For example, in the above implementation, when a user invokes a DVR function for content, the content may be scheduled to be re-downloaded. In a different implementation, when the user requests content player device 102 to download content, content player device 102 may determine whether the user has invoked a function that requires the device to play the content when the user makes the request. If content player device 102 determines that the user has not invoked the function, content player device 102 may initiate a download of the content at a fixed quality (e.g., a high-resolution, low noise, etc.), receive the fixed-quality content from content server device 106, and store the fixed quality content. If content player device 102 determines that the user has invoked the function, content player device 102 ay initiate a download of the content at variable quality, receive the variable quality content from content server device 106, and play the variable-quality content.

Without an accompanying viewing function (e.g., the user presses the record button on a remote control), content player device 102 may initiate a fixed quality stream of the content from content server device 106 or cloud, and/or cloud may send or schedule to download the content to content player device 102, at the desired quality.

In addition, while series of blocks have been described with regard to an exemplary process illustrated in FIG. 6, the order of the blocks may be modified in other implementations. In addition, non-dependent blocks may represent acts that can be performed in parallel to other blocks. Furthermore, process 600 may include additional, fewer, or different blocks than those illustrated in FIG. 6.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
    a network interface to:
        receive data over a network, and
        send data over the network; and
    a processor to:
        begin recording content during a first download of the content from a remote device,
        receive, from the remote device, a first portion of the content at a first quality via the network interface during the first download,
        record the first portion of the content at the first quality as part of the recording,
        obtain bandwidth information in response to receiving the first portion of the content,
        send the bandwidth information to the remote device via the network interface in response to obtaining the bandwidth information,
        receive, from the remote device via the network interface, a second portion of the content at a second quality in response to sending the bandwidth information,
        record the second portion of the content at the second quality as part of the recording,
        determine whether the device has finished the first download of the content, and
        schedule a second download of the content at a fixed quality from a remote system in response to determining that the device has finished the first download.

2. The device of claim 1, wherein the remote system includes at least one of:
    the remote device; or
    a cloud.

3. The device of claim 1, wherein the device comprises:
    a set-top box; a personal computer; a laptop computer; a smart phone; or a tablet computer.

4. The device of claim 1, wherein the bandwidth information includes:
    information identifying an amount of bandwidth available at the device.

5. The device of claim 4, wherein the amount of bandwidth available at the device includes:
    a maximum bandwidth at the device minus currently used bandwidth.

6. The device of claim 1, wherein the processor is further configured to:
    receive the first portion and second portion of the content at the fixed quality from the remote system during the second download.

7. The device of claim 6, wherein the first portion and second portion of the content received during the second download includes a portion that replaces one of the first portion and second portion of the content received during the first download.

8. The device of claim 6, wherein the processor is further configured to:
    receive other portions of the content; and
    replace all of the content at the device with the received content at the fixed quality.

9. The device of claim 1, wherein the processor is further configured to:
    send the first portion of the content to one of a computer, speakers, or a television.

10. The device of claim 1, wherein when the processor records the first portion of the content at the first quality, the processor is further configured to:
    record the content at the second quality when the device has buffered more than a predetermined amount of the content at the second quality.

11. A method comprising:
    beginning, by a content player device, a recording during a first download of content from a remote device to the content player device;
    receiving, by the content player device, a first portion of the content at a first quality from the remote device during the first download;
    recording, at the content player device, the first portion of the content as part of the recording;
    determining whether the content player device has finished the first download;
    when determined that the content player device has not finished the first download, determining a currently available bandwidth at the content player device;
    sending, by the content player device, bandwidth information describing the currently available bandwidth to the remote device in response to obtaining the bandwidth information;
    receiving, by the content player device, a second portion of the content at a second quality sent from the remote device in response to the bandwidth information;
    recording the second portion of the content being received during the first download as part of the recording;
    determining, by the content player device, whether the content player device has finished the first download of the content; and
    scheduling a second download of the content from a cloud at a particular time in response to determining that the content player device has finished the first download.

12. The method of claim 11, further comprising:
    performing the second download of the content at the particular time; and
    replacing the first portion with a portion of the downloaded content.

13. The method of claim 12, wherein the content includes:
    a video; or music.

14. The method of claim 11, further comprising:
    playing the first portion of the content at the content player device; and
    outputting the played first portion to a digital television.

15. The method of claim 11, further comprising:
    playing the first portion of the content at the content player device; and
    outputting the played first portion to a display screen of the content player device.

16. The method of claim 11, wherein determining a currently available bandwidth includes:

requesting a local network device to provide the content player device with an amount of bandwidth used by the local network device.

17. The method of claim 11, further comprising:
triggering one of digital video recorder (DVR) functionalities.

18. A non-transitory computer readable medium, comprising computer-executable instructions, when executed by one or more processors, cause the one or more processors to:
begin, at a content player device, a recording during a first download of content from a remote device to the content player device;
receive, at the content player device, a first portion of the content at a first quality from the remote device during the first download;
record the first portion of the content at the content player device as part of the recording;
determine whether the content player device has finished the first download;
when determined that the content player device has not finished the first download, determine a currently available bandwidth at the content player device;
send, from the content player device, bandwidth information describing the currently available bandwidth to the remote device in response to obtaining the bandwidth information;
receive, at the content player device, a second portion of the content at a second quality sent from the remote device in response to the bandwidth information;
record the second portion of the content being received during the first download as part of the recording;
determine whether the content player device has finished the first download of the content; and
schedule a second download of the content from a cloud at a particular time in response to determining that the content player device has finished the first download.

19. The non-transitory computer-readable medium of claim 18, wherein the instructions for causing the one or more processors to determine a currently available bandwidth, when executed by the one or more processors, cause the one or more processors to:
request a local network device to provide the content player device with an amount of bandwidth used by the local network device.

20. The non-transitory computer-readable medium of claim 18, wherein the instructions for causing the one or more processors to record the first portion of the content at the first quality, when executed by the one or more processors, cause the one or more processors to:
record the content at the second quality when the content player device has buffered more than a predetermined amount of the content at the second quality.

* * * * *